A. C. JAQUES.
Wagon Brake.
No. 97,775.  Patented Dec. 14, 1869.
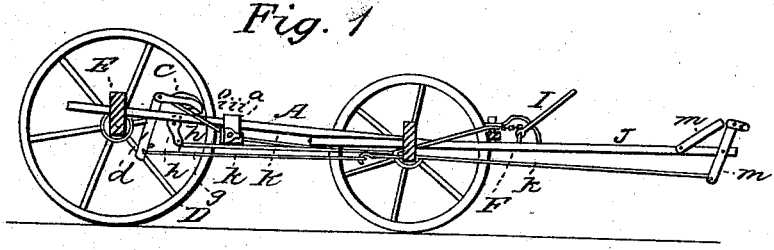
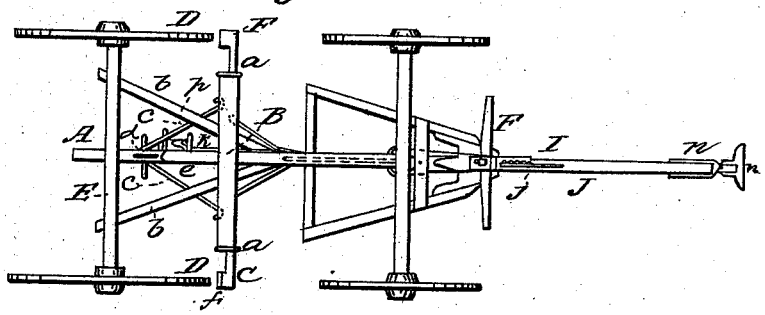
Witnesses:
Inventor:

United States Patent Office.

ABRAM C. JAQUES, OF LEAVENWORTH, KANSAS.

Letters Patent No. 97,775, dated December 14, 1869.

IMPROVED WAGON-BRAKE.

The Schedule referred to in these Letters Patent and making part of the same.

*To all whom it may concern:*

Be it known that I, ABRAM C. JAQUES, of Leavenworth city, in the county of Leavenworth, and State of Kansas, have invented certain new and useful Improvements in Wagon-Brakes, and the mechanism for locking them to the wagon-wheels, and liberating the same; and the following is a full, clear, and exact description of the same, reference being had to the accompanying drawings, making a part of this specification, in which—

Figure 1 represents a sectional side view or elevation, showing my devices, with their connecting-rods and links.

Figure 2 shows a plan or top view of the same devices for locking the brakes, and liberating them when desired.

The object of my invention is to make self-acting and other wagon-brakes more efficient and safe, for locking the wheels, and holding them permanently from revolving any given length of time, so that a fractious team may be, in a great measure, controlled, and runaway mules or horses be left, with more safety, to stand for a time without tying or watching, the action being produced and the power applied by the stopping and backing up of the team, the fastening being self-acting.

My invention consists in the arrangement and combination of a notched perch or ratchet, a pawl, and lever, connected with the brake-bar, and a rock-shaft or bell-crank lever, to liberate the pawl, all attached to the perch, and operating between the rear braces or hounds, in front of the rear axle, the bell-crank lever being connected, by a rod underneath, with a vertical hand-lever, attached to the top of the pole or tongue, in front of the double-tree, which is also connected, by a link or short chain, to the hand-lever, it being provided with a guide and tooth-ratchet, to operate as hereinafter more fully described.

To enable others to fully understand, make, and operate my improvements, I will describe them in detail.

To the top of the perch A and rear braces $b\ b$, I secure the plate B and guides $a\ a$, in which the brake-bar C is supported, to operate in front, on the periphery of the two rear wagon-wheels D D.

The brake-bar C is connected, by two rods $c\ c$, to the top of a vertical lever, $d$, which has its fulcrum-pin in a mortise through the rear end of the perch A, in front of the rear axle E.

To the top of the lever $d$, is attached a pawl, $e$, extending forward over the perch A, in which is made a series of notches, $i\ i\ i$, for it to catch into, (when permitted,) and hold the brake-blocks $f\ f$ against the wheels.

To one side of the perch A, is attached a bell-crank lever, $h$, with a finger reaching under the pawl $e$, to lift it out of the ratchet $i\ i\ i$, and liberate the brakes.

The bell-crank $h$ is operated by a rod, $g$, connecting it with the movable double-tree F, and a vertical hand-lever, I, which is secured to operate just in front of the double-tree F, on the top of the pole J, it being held in a guide-slot, $j$, in which is a series of notches for the lever to catch in, and hold the double-tree forward, and, at the same time, will prevent the pawl $e$ from catching in the ratchet, to lock the brake on the wheels.

The brake-bar C is forced back by the connecting-rod $k$, underneath the perch A and pole J, which connects with the lever $d$ and the lever $m$, on the front end of the pole or wagon-tongue J, and is similar in its operation to the one described in my specification for improvements in wagon-brakes, filed October 6, 1868.

I make an oblong hole in the rear of the tongue J, for the bolt which holds the double-tree to play in, so that it may be allowed to draw back, and keep the harness-traces from being too slack when going down steep inclines.

I also have a check-brace, $n$, attached to the forward end of the pole J, to hold the lever $m$ from applying unnecessary force to the brakes.

I have made several modifications of my improvements in wagon-brakes, which produce the same results, which I do not deem necessary to describe in detail, as they may be regarded substantial equivalents.

What I claim as my invention, and desire to secure by Letters Patent, is—

1. The ratchet $i\ i\ i$, on the top of the perch A, the pawl $e$ and lever $d$, as arranged therewith, and connected with the brake-bar C, in combination with the bell-crank lever $h$, to liberate the pawl and brakes, all being arranged and operating substantially as and for the purposes set forth.

2. The arrangement of the hand-lever I, guide-ratchet $j$, the movable double-tree F, all connected together, and combined with the brake-locking and liberating mechanism, as herein described.

In testimony whereof, I hereunto subscribe my name, in the presence of—

ABRAM C. JAQUES.

Witnesses:
W. S. JENKINS,
C. L. GARDNER HOPKINS.